United States Patent [19]

Homyk

[11] Patent Number: 4,851,185
[45] Date of Patent: Jul. 25, 1989

[54] RADIATION SHIELDING METHOD AND APPARATUS

[76] Inventor: William A. Homyk, R.D. #1, Martin Rd., Hopewell Junction, N.Y. 12533

[21] Appl. No.: 108,482

[22] Filed: Oct. 14, 1987

[51] Int. Cl.$^4$ ............................................. G21C 19/00
[52] U.S. Cl. ................................... 376/287; 376/272; 141/59
[58] Field of Search ................ 376/272, 287; 220/227, 220/228, 352, 428; 141/59, 65; 137/206; 250/506, 507, 515, 517, 519; 417/118

[56] References Cited

U.S. PATENT DOCUMENTS

| | | | |
|---|---|---|---|
| 1,919,634 | 7/1933 | Haupt et al. | 220/227 |
| 2,947,437 | 8/1960 | Greer | 220/428 |
| 3,111,074 | 11/1963 | Kennard, Jr. et al. | 141/65 |
| 3,264,189 | 8/1966 | Regimbal | 376/287 |
| 3,917,953 | 11/1975 | Wodrich | 376/272 |
| 4,016,749 | 4/1977 | Wachter | 376/272 |
| 4,069,923 | 1/1978 | Blumenau et al. | 376/272 |
| 4,318,492 | 3/1982 | Peehs et al. | 220/228 |
| 4,703,936 | 11/1987 | Clark, Jr. et al. | 376/287 |
| 4,723,682 | 2/1988 | Barbillat | 220/227 |

FOREIGN PATENT DOCUMENTS 2718305 11/1978 Fed. Rep. of Germany ...... 376/272
2731035 1/1979 Fed. Rep. of Germany ...... 376/272

Primary Examiner—Deborah L. Kyle
Assistant Examiner—Daniel Wasil
Attorney, Agent, or Firm—Brooks Haidt Haffner & Delahunty

[57] ABSTRACT

Method and apparatus for shielding an otherwise exposed upper portion of a radioactive reactor component disposed in a refueling pool of water having a depth less than the height of the component. A vessel with a top end wall, a side wall larger than the transverse size of the component is disposed over the exposed upper portion until the lower rim thereof is immersed in the pool and the top end wall and the side wall are in spaced relation to the upper portion of the component. Fluid, mainly air, is evacuated from the vessel to cause water from the pool to enter the vessel and provide a water level therein which is above the water level in the pool and between the component and the walls of the vessel. The vessel is reinforced to withstand the pressures caused by removal of fluid therefrom and is suspended by beams and legs, the latter being engageable with the pool walls. The fluid is evacuated by a pump controlled by a level detector responsive to the water level in the vessel to maintain the desired latter water level.

5 Claims, 3 Drawing Sheets

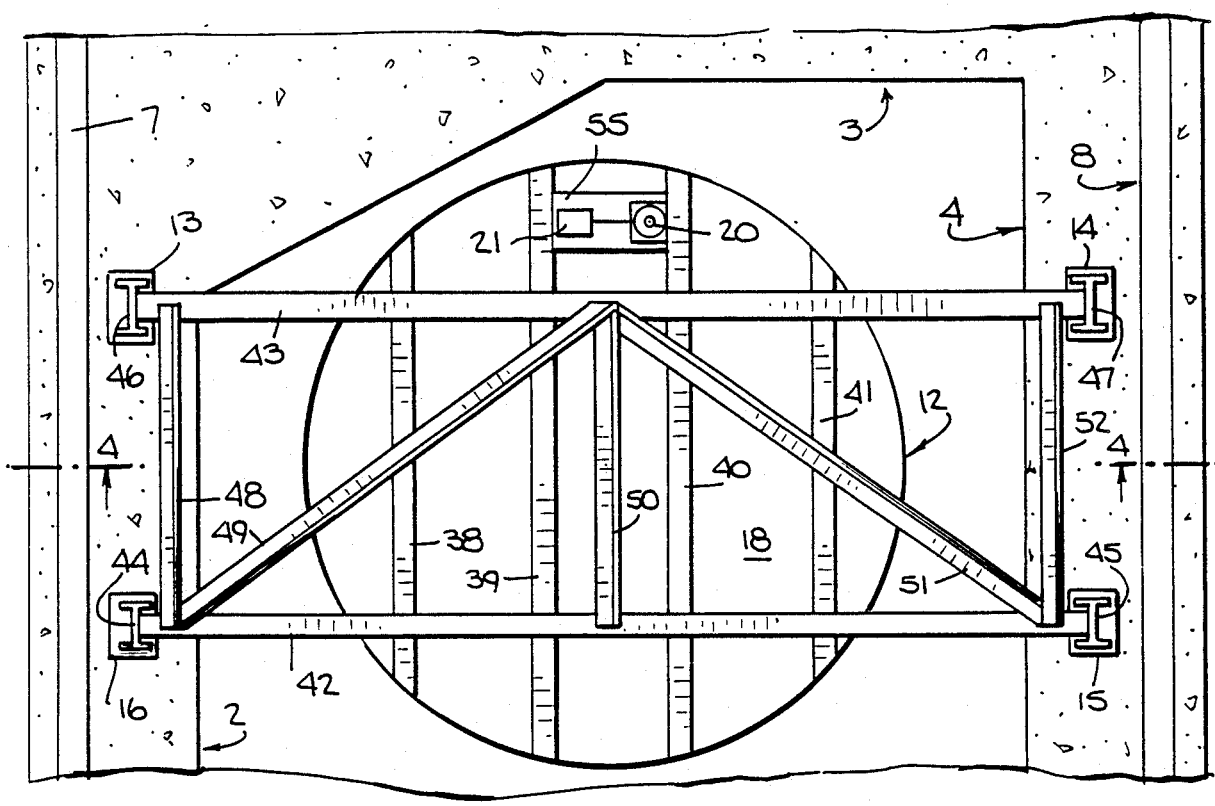
Fig. 3.
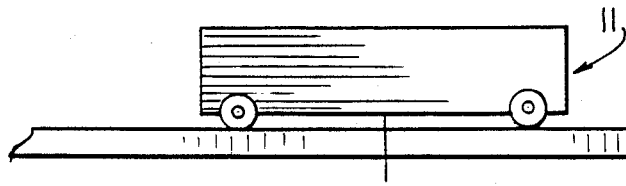
Fig. 4.
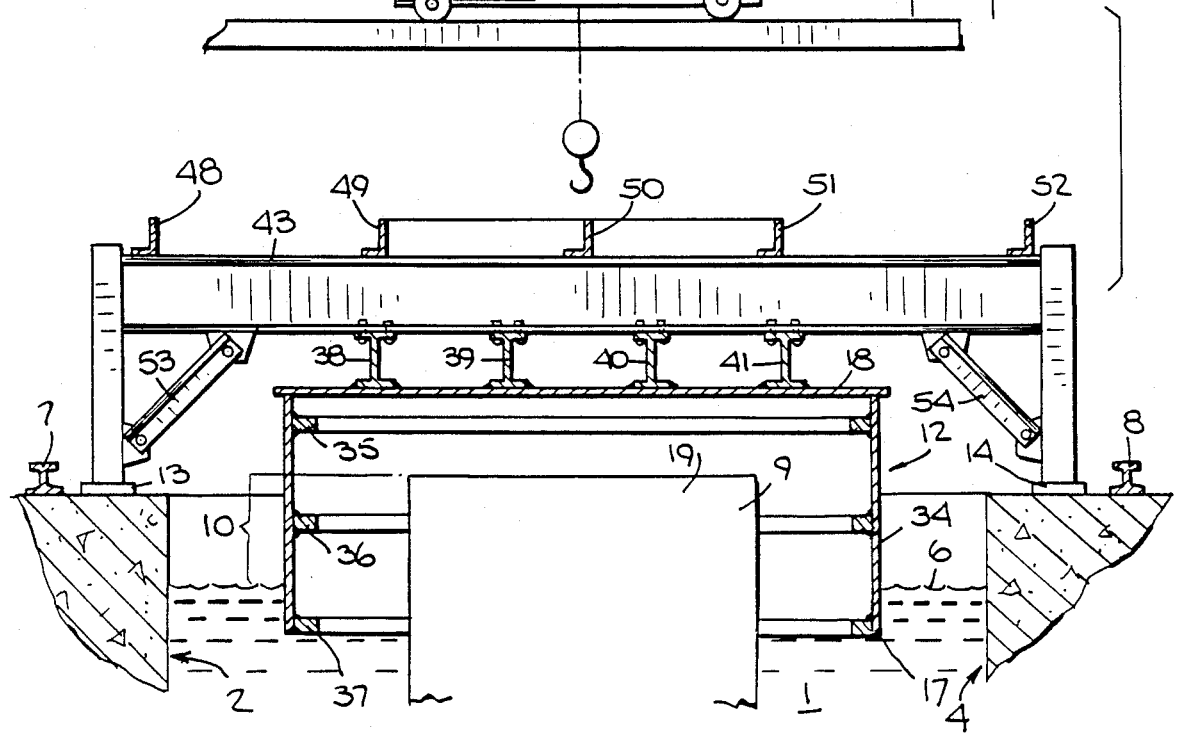

RADIATION SHIELDING METHOD AND APPARATUS

BACKGROUND OF THE INVENTION

This invention relates to the shielding of radiation emitted by nuclear reactor components during the removal thereof from the nuclear reactor, and particularly, to a method and apparatus for absorbing radiation when such components are removed from the reactor during maintenance and refueling operations.

A nuclear reactor includes a number of components within the reactor shell, such as fuel rods, extension or lifter rods supported by a grid, etc. From time-to-time, it is necessary to remove some or all of such components from the reactor for maintenance and/or refueling purposes. As is known, such components are radioactive, and it is both necessary and desirable to protect maintenance personnel with respect to radiation energy emitted by said components. For example, the federal standard for exposure of an individual to such radiation is 3000 millirems in a quarter of a year, with 5000 millirems as a maximum yearly dose, but some nuclear reactor operating companies have a requirement that the exposure not exceed 1250 millirems in a quarter of a year.

It is known to use water as a shield in nuclear reactor installations during the opening of the reactor and the removal of components therefrom. For example, it is known to provide a tank (refueling pool) with concrete walls around and spaced from the reactor but having its walls extending above the top of the reactor and to fill the tank close to the top thereof with water with additives, such as boric acid, while the reactor is open to absorb most of the radiation from the reactor and its components during the time that it is open. A crane is provided above the tank for the removal of the reactor cover and such components.

It is sometimes found that in some of the older nuclear reactor installations having such a tank, the depth of the tank is such that when the tank is substantially filled with water, the water does not completely cover the reactor components after they are removed from the reactor and placed in the water resting either directly on the bottom of the tank or on a stand resting on the bottom of the tank.

For example, one known installation includes a component known as the "upper internals", which consists of a plurality of lifter rods, e.g. 53 rods, detachably connected to the control rods during the operation of the reactor to control the nuclear chain reaction. The height of such upper internals is such that when they are removed from the reactor and placed in the water-filled tank, they are not completely covered by the water. Thus, the upper end of the upper internals may project to a greater or lesser extent above the upper surface of the water, which means in some cases that as much as 16 inches of the upper ends of such internals will not be shielded. The radiation level of the exposed portion of the upper internals may be of the order of 100–200 millirems per hour which means that personnel exposed to such radiation may reach their radiation quota within only about six hours of exposure. Of course, if the normal refueling time of several days applies, this could mean serious reduction in the number of skilled supervisors or foremen who are continuously available.

Therefore, it is desirable to use some type of shielding between the maintenance personnel and the parts of the upper internals protruding from the pool. In the past, radiation exposure of workers has been reduced by the use of lead blankets on the conventional manipulator crane which is positioned adjacent to the exposed tops of the upper internals as they rest in their stored position in the refueling pool. However, due to weight restrictions imposed by crane manufacturers, crane indexing problems caused by the weight of the lead blanket, and the difficulties encountered in attempting to produce effective shielding by placing lead blankets over such large equipment as a crane, the use of lead blankets for shielding is not entirely satisfactory.

Because of other structure in the reactor containment vessel, such as cranes and their equipment, it is practically impossible to increase the depth of the tank, and hence, the depth of the water, and it would be expensive to increase the depth of the tank, bearing in mind that the tank may have concrete walls two feet thick and spaced about 20 feet apart, and the walls may be over 100 feet in length. Furthermore, an increase in the depth of the entire tank would be unnecessary.

One object of the invention is to provide complete shielding for a radioactive reactor component, such as the upper internals, which is removed from a reactor and which has a height greater than the depth of the water in the water filled refueling tank when the latter is filled to capacity.

SUMMARY OF THE INVENTION

In accordance with the invention, the portion of a radioactive reactor component, such as the upper internals, which extends above the upper surface of he water in the existing water-filled refueling tank, is covered by an inverted vessel which is open at its bottom, but which is otherwise gas tight, so that such portion of the component is within the vessel and the bottom wall portion of the inverted vessel is immersed in the water. With the vessel supported in such position, air is evacuated from the interior of the upper portion of the vessel which causes the water level in the vessel to rise above the upper level of the surrounding water in the tank and causes the portion of the component which would otherwise project above the water level in the tank to be completely covered by the higher level of water within the inverted vessel. In this way, the radiation level outside the vessel and from the component may be reduced by as much as 30 times, or more.

The invention also provides apparatus suitable for such use and includes a reinforced vessel capable of withstanding the pressures encountered due to the evacuation of air from the vessel and the forces encountered when lifting and moving the vessel. The apparatus of the invention may also include air evacuation apparatus mounted on the vessel structure, or separately mounted, and means for maintaining, lowering, and determining the water level within the vessel.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 3 is a fragmentary plan view of the apparatus of the invention in cross-section with the refueling pool shown in FIG. 2;

FIG. 4 is a fragmentary, cross-sectional view of the apparatus shown in FIG. 3; and is taken along the line 4—4 in FIG. 3.

DESCRIPTION OF THE PREFERRED EMBODIMENTS

Figure 1:
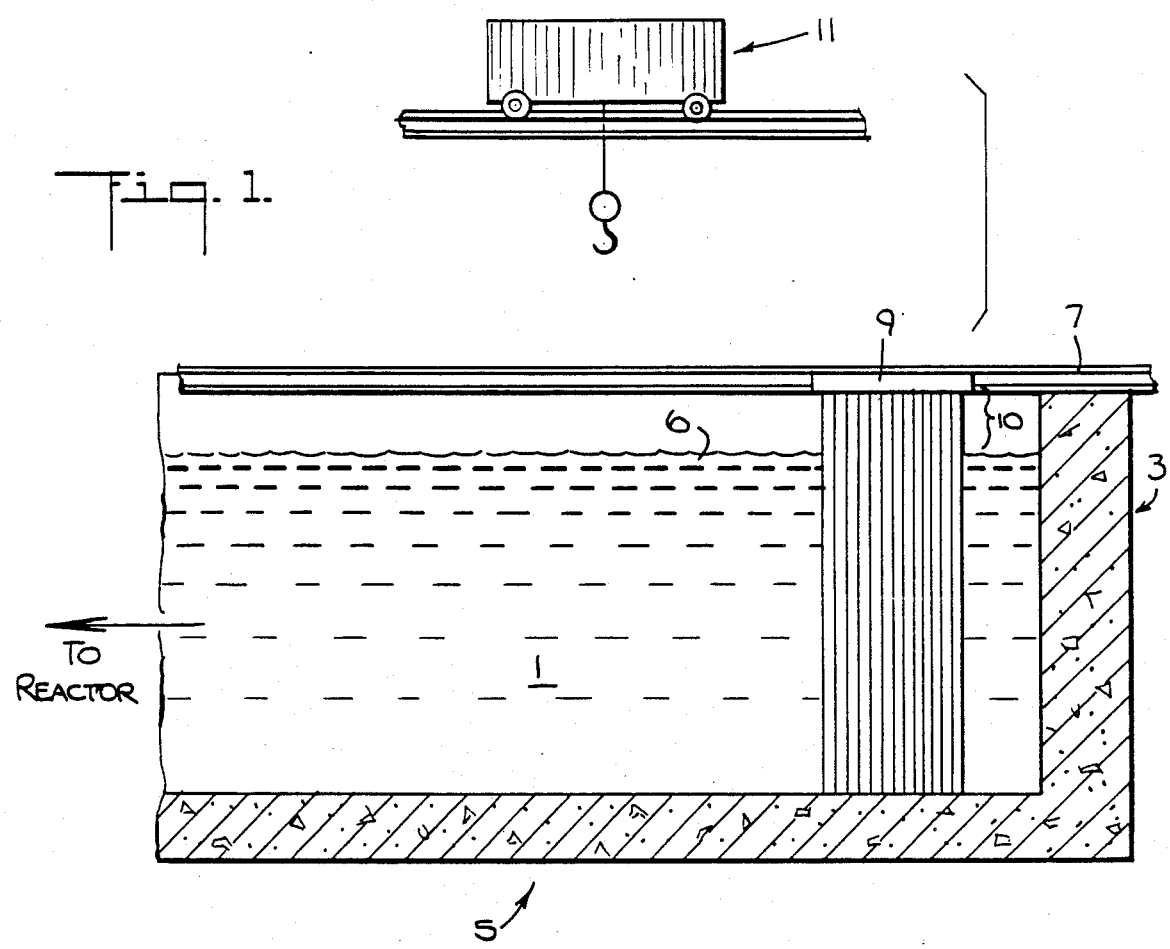
FIG. 1 is a fragmentary schematic side elevation view, partly in cross-section, of a portion of a nuclear reactor plant showing a refueling pool with "upper internals" therein and an overhead crane.
Figure 2:
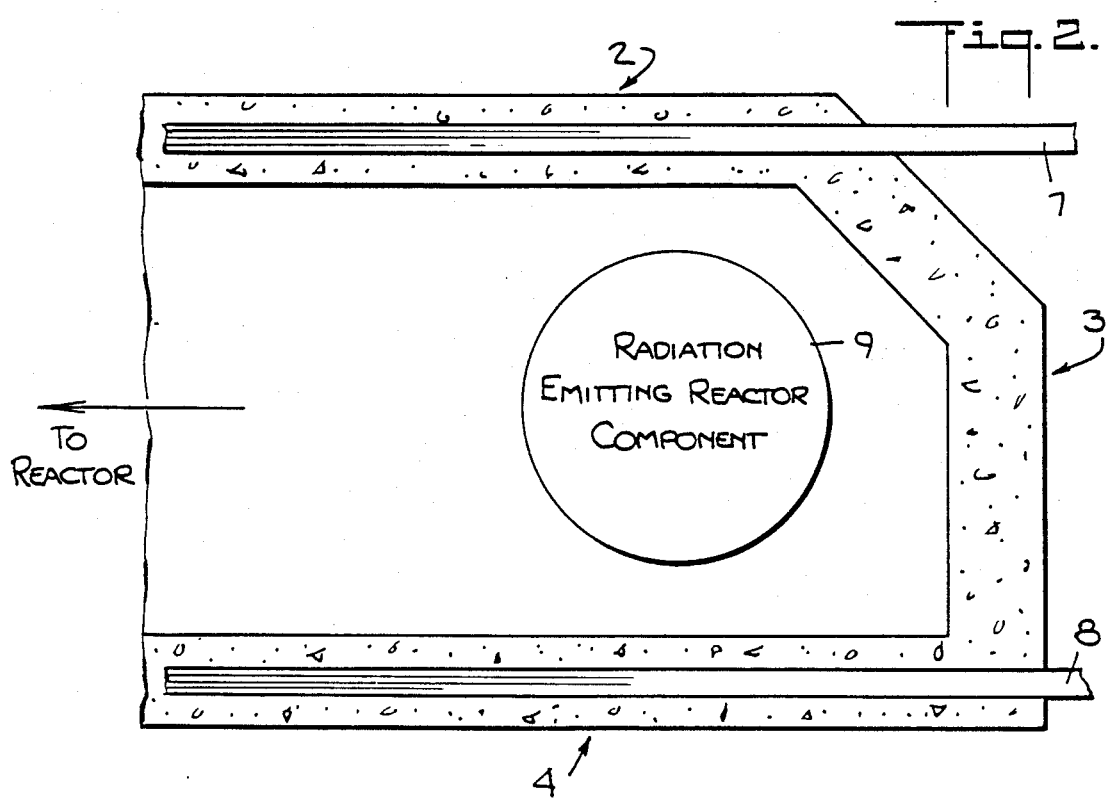
FIG. 2 is a plan view of the apparatus shown in FIG. 1 with the overhead crane and the apparatus of the invention omitted.

FIGS. 1 and 2 illustrate schematically a portion of a conventional refueling water pool 1 within a tank having concrete side walls 2, 3 and 4 and a concrete bottom wall 5. The pool 1 comprises water, with additives if desired, and the water level 6 is a small distance below the upper surfaces of the side walls 2, 3 and 4. Although not necessary to the invention, FIGS. 1 and 2 illustrate a pair of rails 7 and 8 for supporting a manipulator crane (not shown).

FIGS. 1 and 2 also illustrate a radiation emitting reactor component 9, such as the "upper internals" of a nuclear reactor, which have been removed from the reactor and placed in the water pool 1. It will be observed that the upper portion 10 of the component 9 is above the level 6 of the water pool 1, and therefore, there is no water shield around such portion. Even if the water level were raised to the level of the upper surfaces of the side walls 2, 3 and 4, there still would be a portion of the component 9 which is not covered by the water, and normally, the bank is not filled with water to the level of the upper surfaces of the side walls 2, 3 and 4. Accordingly, the unshielded portion 10 emits radiation to which maintenance personnel would be exposed during maintenance, refueling, etc. of a nuclear reactor of the construction described.

FIG. 1 also schematically illustrates a crane 11 which is used for removing the reactor cover and for removing components from within the reactor.

In accordance with the invention, after the component 9 is removed from the reactor and placed in the water pool 1, a reinforced, inverted vessel 12, which may have the hollow cylindrical shape shown, is lowered over the component 9 until the pool parts 13, 14, 15 and 16 of the supporting structure for the vessel 12 rest on the upper surfaces of the side walls 2 and 4 and the lower rim 17 is immersed in the water pool 1 as shown in FIG. 4. Since the vessel 12 is evacuated in the manner set forth hereinafter, water from the pool 1 enters the vessel 12 and lowers the level of the water pool 1, and the lower rim 17 is immersed in the water pool 1 by an amount sufficient to maintain it immersed therein when the level of the water pool 1 lowers during evacuation of the vessel 12. The dimension of interior diameter of the vessel 12 is greater than the dimension of the exterior diameter of the component 9. The difference between the interior dimension of the vessel 12 and the exterior dimension of the component 9 and the height of the vessel 12 from the lower rim 17 to the end wall 18 thereof are selected so that when the vessel 12 is positioned as shown in FIG. 4, the end wall 19 is spaced from the top 19 of the component 9 and the interior of the vessel 12 is spaced from the exterior of the component 9 by a distance to provide a water covering for the component 9 sufficient to provide the desired shielding of the upper portion 10 of the component 9. For example, the dimensions may be selected so as to provide two feet of water above the top 19 and and two feet of water between the component 9 and the interior of the wall of the vessel 12 when the vessel is evacuated as set forth thereinafter.

Figure 5:
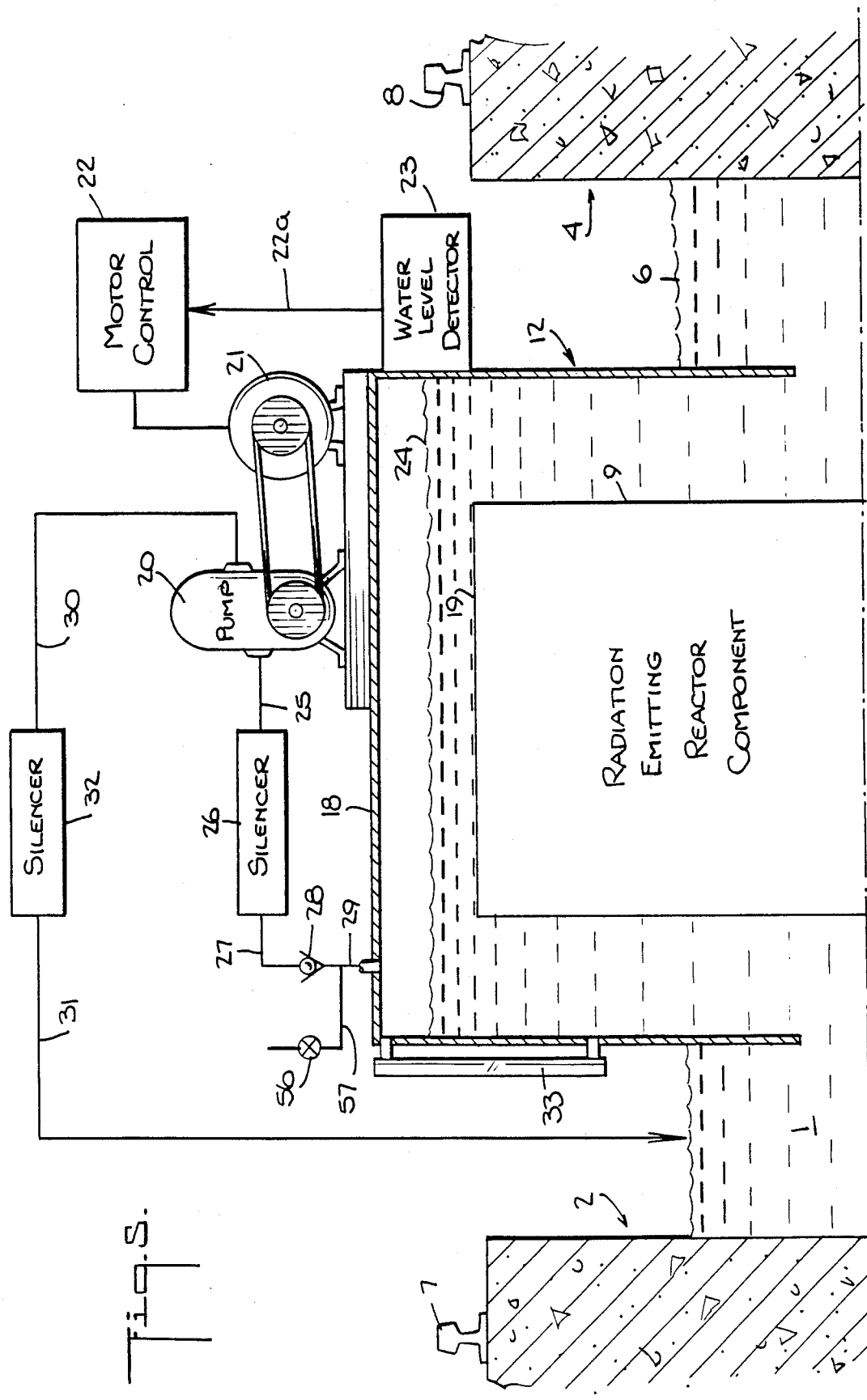
FIG. 5 is a schematic diagram of the apparatus shown in FIGS. 3 and 4.

After the vessel 12 is put in place as illustrated in FIGS. 3 and 4, air is removed from the vessel 12 as illustrated schematically in FIG. 5. Although other types of pumping apparatus may be used to remove air from the vessel 12, a preferred embodiment of the pumping apparatus comprise a pump 20 in the form of a rotary blower driven by an electric motor 21 connected to a motor controller 22. The pump 20 may, for example, be a model 22-U-RAI rotary blower manufactured by the Rods Div. of Dresser Industries, Inc. 900 W. Mount St., Connersville, Ind., and having a 20 cfm capacity at 12.2 psig inlet pressure and be driven by a one horse power motor. The motor controller 22 is connected by a line 22a to a conventional water level detector 23 at the side of the vessel 12 which causes the controller 22 to energize the motor 21 when the water level 24 in the vessel 12 decreases below a desired level and to deenergize the motor 21 when the water level 24 is at the desired level.

The intake side of the pump 20 is connected by a pipe 25, a silencer 26, a pipe 27, a check valve 28 and a pipe 29 to the interior of the vessel 12. Except for the opening for the pipe 29 in the end wall 18, and except for the open end thereof which is below the upper surface of the water pool 1, the vessel 12 is gas tight.

The pump 20 discharges air and any water which may accompany the air through pipes 30 and 31 and a silencer 32 into the water pool 1.

The water level within the vessel 12 may be visually observed by means of a conventional liquid level indicating means in the form of a glass sight tube 33 attached to a side wall of the vessel 12 and connected for fluid flow to the interior of the vessel 12.

It will be apparent that the vessel 12 acts as a "Bell" jar in that when air is exhausted from within the vessel 12, water from the pool 1 will flow into the interior of the vessel 12 and provide a water surface level 24 within the vessel 12 which is above the water surface level 6 in the water pool 1. Thus, after the vessel 12 is positioned as illustrated in FIG. 4 and the pump 20 is operated, the water surface level within the vessel 12 can be raised to the lower surface of the bottom wall 18, but normally, it will be raised only by an amount sufficient to provide the desired shielding of the top 19 of the component 9 and will be spaced from the lower surface of the end wall 18. For example, to raise the water surface level in the vessel 4.6 ft. above the water surface level 6 in the pool 1 requires a vacuum in the vessel of only −2 p.s.i.

However, because of the pressures exerted on the walls of the vessel 12 when it is evacuated and because of handling and lifting forces involved, it is necessary that the vessel 12 be reinforced and that the walls thereof be supported if the thickness of such walls is to be kept to an acceptable value.

One design of such a vessel 12 and its supports for shielding a component 9 having a diameter of approximately 10 ft. and extending above the pool water level 6 by approximately 16 in. is illustrated in FIGS. 3 and 4. The vessel 12 has a side wall 34 in the form of a hollow cylinder having an outside diameter of 14 ft., a thickness of ¼ in. and a height of 5½ ft. The end wall 18 has a thickness of ⅜ in., and preferably, the side wall 34 and the end wall are made from stainless steel. The end wall 18 and the side wall 34 are welded together in a conventional and air tight manner, and the side wall 34 is internally reinforced by three stainless steel stiffening rings 35, 36 and 37 which are welded to the side wall 34 and which, for example, can be a W4×8.44 stainless steel structural member.

The end wall 18 is reinforced with respect to buckling by four I-beams 38–41 preferably, of stainless steel, which can be welded on their lower flanges to the end wall 18 and secured to carbon steel main suspending beams 42 and 43 which are secured at their ends to legs 44–47. The main beams 42 and 43 are laterally braced by L-shaped structural members 48–52 of carbon steel. The supporting legs 44–47 are braced by L-shaped carbon steel braces, such as the braces 53 and 54 (FIG. 4), which are secured at their ends to the main beams and the legs respectively. The various structural members can be of the following characteristics.

Members 38–41—W12×26 structural members-stainless steel

Main beams 42, 43—W21×50 structural members-carbon steel

Legs 44–47—W10×22 structural members-carbon steel

Lateral members 48–52—3½"×3½"×¼ structural members-carbon steel

Leg braces 53, 54—3½×3½"×¼ structural members-carbon steel

As shown in FIG. 3, the motor 21 and the pump 20 may be mounted on a support plate 55 secured to the end wall 18.

When it is desired to lower the level of the water in the vessel 12 for the removal of vessel 12 and the component 9, the motor 21 is deenergized, and a vent valve 56 (FIG. 5), which can be a one inch valve and which is connected to the pipe 29 by a pipe 57, is opened to permit air to enter into the upper part of the vessel 12.

Although preferred embodiments of the present invention have been described and illustrated, it will be apparent to those skilled in the art that various modifications may be made without departing from the principles of the invention.

I claim:

1. In a system having a pool of liquid in which a radiation emitting component is immersed for shielding said component with respect to radiation emitted by said component, the method of shielding a portion of such component extending above the upper surface of the liquid of said pool which comprises:

surrounding the portion of the upper end of said component which extends above the upper surface of said pool of liquid with a vessel having a top end wall and a side wall, said top end wall being disposed above and spaced from the extending upper end of said component and said side wall extending around and being disposed with said side wall spaced from the sides of said component and with the lower end of said side wall extending into said pool of liquid; and evacuating gas in said vessel to draw liquid from said pool into said vessel until the upper level of the surface of said liquid in said vessel is above said extending upper end of said component.

2. The method as set forth in claim 1 wherein said vessel has an open lower end and after said component is immersed in said pool, said vessel is lowered over said component with said lower end lowermost and said gas is pumped from the upper portion of said vessel by pumping means connected for fluid flow with the interior of said vessel and to said end wall.

3. The method as set forth in claim 1 wherein after said upper level of the surface of said liquid is above said upper end of said component, the last-mentioned said level is maintained until it is desired to expose said component at which time gas is admitted into said vessel to cause the level of the upper surface of the liquid in said vessel to lower.

4. The method as set forth in claim 1 wherein the interior dimensions of said vessel are selected in relation to the interior dimensions of said upper portion of said component so as to provide an amount of said liquid between said top end wall and said side wall sufficient to reduce the amount of radiation from said component and outside said vessel to no more than one-twentieth the amount of radiation in the absence of said amount of liquid between said top end wall and said side wall and said upper portion of said component.

5. The method as set forth in claim 4 wherein said interior dimensions of said vessel are selected to provide at least two feet of said liquid between the interior of said vessel and the exterior of said upper portion of said component.

* * * * *